July 7, 1931.  W. A. TOMLINSON ET AL  1,813,783
SAW TABLE
Filed Dec. 5, 1928    2 Sheets-Sheet 1
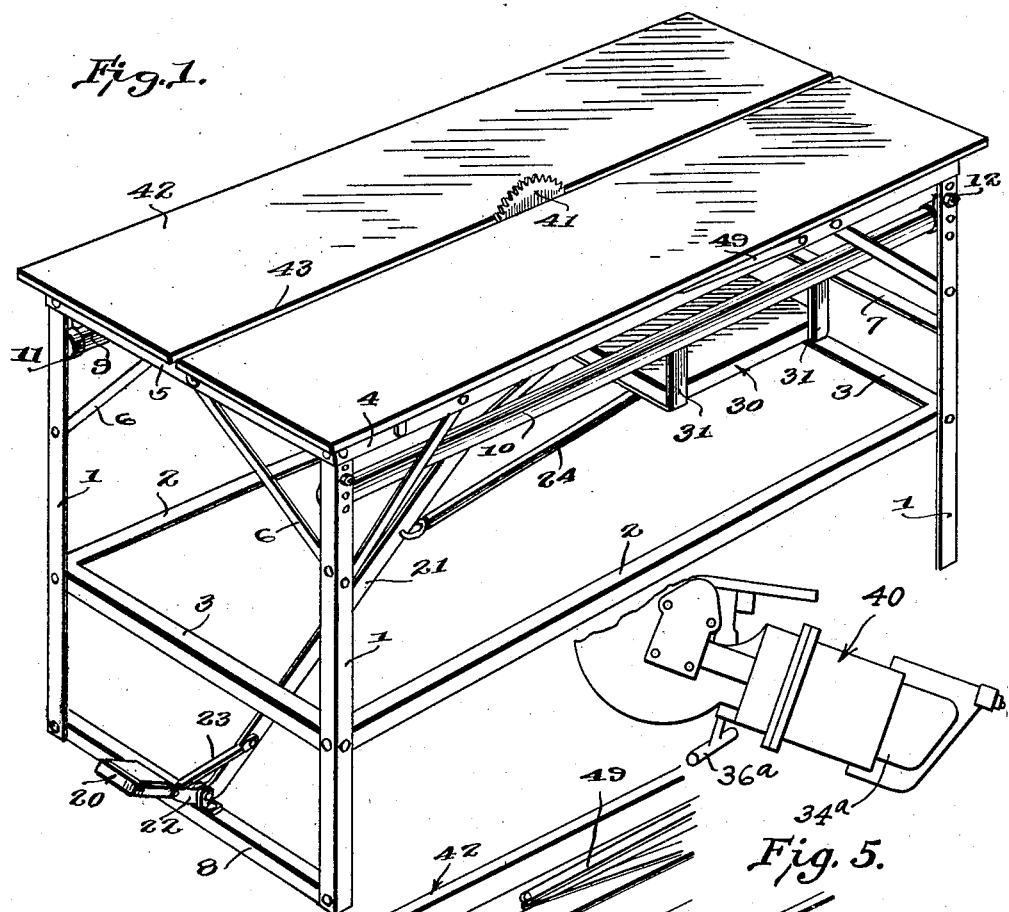
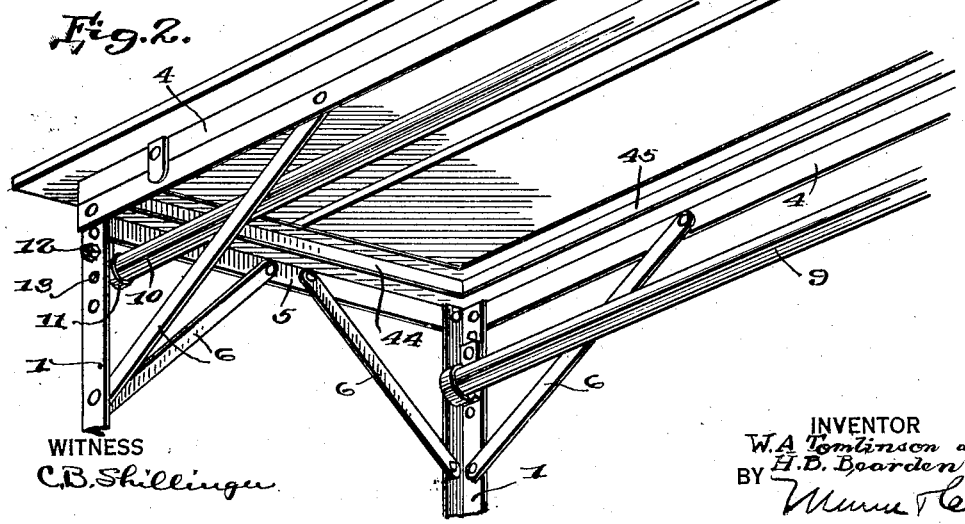
WITNESS
C. B. Shillinger
INVENTOR
W. A. Tomlinson and
BY H. B. Bearden
ATTORNEY

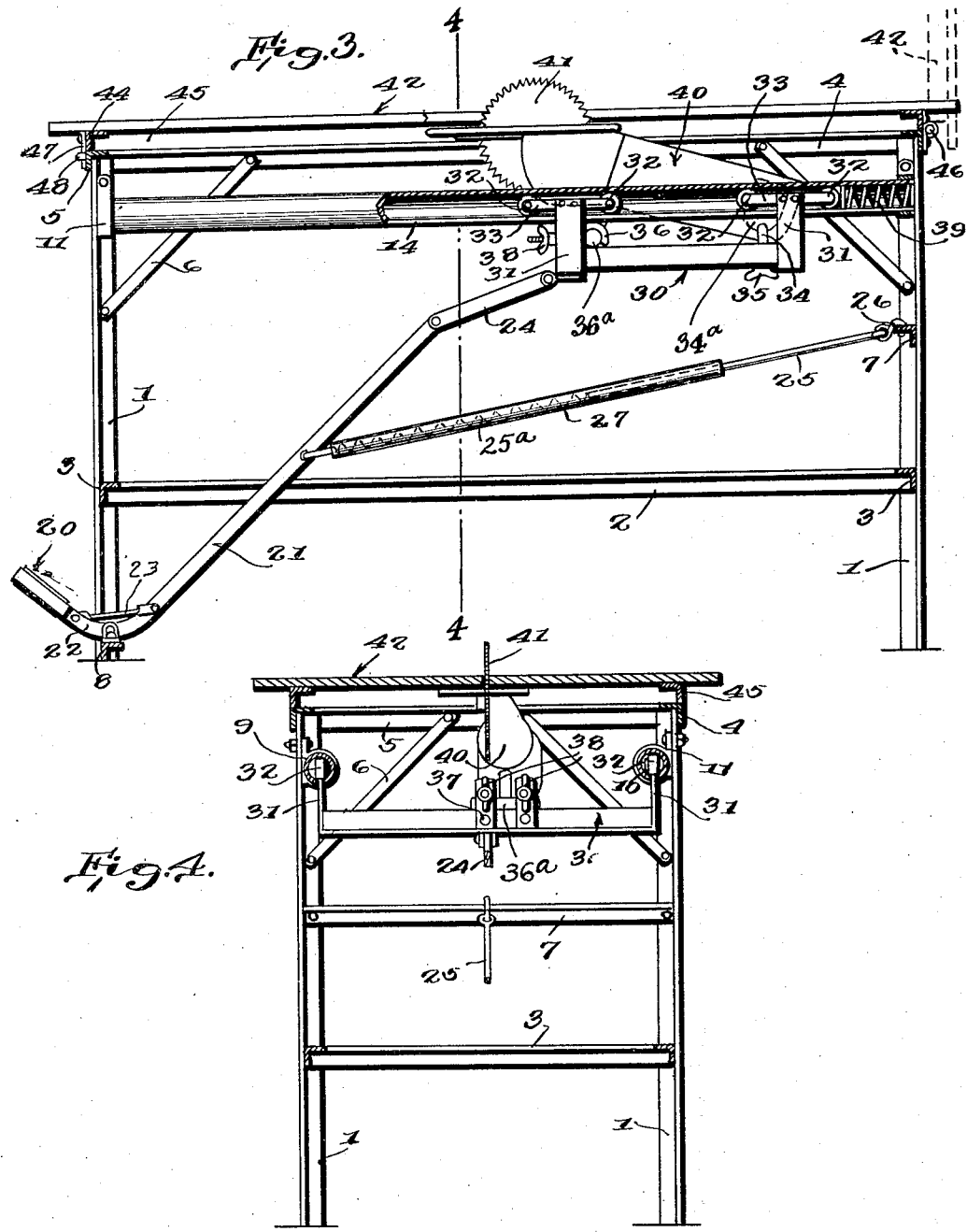

Patented July 7, 1931

1,813,783

UNITED STATES PATENT OFFICE

WILLIAM A. TOMLINSON AND HOWELL B. BEARDEN, OF PHOENIX, ARIZONA

SAW TABLE

Application filed December 5, 1928. Serial No. 323,978.

This invention relates to saw tables for use in connection with power driven saws.

A primary object of the invention is to construct a table or work bench for use in connection with a power saw having means for connecting the saw with a foot lever to adapt the saw to travel a predetermined distance and leaving the hands of the operator free to manipulate the work to be sawed.

Another object is to so construct such a table that any portable power saw may be quickly mounted thereon and operated either as a stationary saw or as a traveller and when not desired for use in connection with the table it may be easily removed and used as a portable saw.

Still another object of the invention is to provide a saw table or bench equipped with a foot controlled reciprocable saw carrier which constitutes a time saver in rip sawing as well as insuring true work; also in pattern or other work and which renders the saw safer than when hand used.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a perspective view of a table constructed in accordance with this invention with a saw blade shown in connection therewith;

Fig. 2 is a detail perspective view taken from one end of the table from the underneath portion thereof showing the operating mechanism;

Fig. 3 is a longitudinal section with parts broken out;

Fig. 4 is a transverse section taken on the line 4—4 of Fig. 3 and

Fig. 5 is a side elevation showing the saw used in connection with applicants' invention, it being in inverted position as it is when in such use.

In the embodiment illustrated the table constituting this invention comprises a supporting frame preferably made of angle iron to render it sufficiently strong to resist the strain to which it will be subjected and yet light enough to be readily transported from place to place as may be desired. The frame here shown comprises four corner legs 1 connected at points intermediate their ends by side bars 2 and end bars 3 and at their upper ends by similar side and end bars 4 and 5, the frame being braced at its upper end by diagonally disposed strap iron braces 6 which connect the legs with the end and side bars at the top of the frame, as is shown clearly in the drawings.

An end cross bar 7 connects the rear legs of the table above the bars 2 and 3 and is designed to strengthen the frame and to form a connection for a carriage return spring presently to be described.

A cross bar 8 connects the lower ends of the front end legs of the table and in addition to bracing said legs forms a support for a saw carriage operating pedal 20 which will be presently more fully described.

Extending longitudinally of the table at opposite sides thereof and secured by their ends to the upper portions of the legs 1 are two tubular track members 9 and 10, carried by hangers 11 which are adjustably connected with the upper end of the legs 1 by bolts 12 passed through one of the series of apertures 13 formed in said legs which provides for the proper positioning of these tracks and the carriage 30 carried thereby to adapt the table for use in connection with power saws of different sizes. The tubular tracks 9 and 10 are slotted longitudinally on their lower faces as shown at 14 in Fig. 3 and through which slots extend standards or uprights 31 carried by the opposite ends of the carriage 30. Ball bearing rollers 32 are carried by the upper end of each standard 31 which rollers are designed to travel on the track members 9 and 10 for guiding the carriage 30 in its reciprocatory movement back and forth as will be presently more fully described. These rollers 32 as shown are mounted on opposite ends of bars 33.

The pedal 20 is carried by a lever 21 fulcrumed at its lower end on cross bar 8, said fulcrumed end having a laterally extending arm 22 to which the pedal is attached. A brace 23 connects the arm 22 with the body portion of the lever 21 so as to adapt it to resist the strain to which it is subjected.

The upper end of the lever 21 is connected by a link 24 with the front end of the carriage 30 whereby when the pedal 20 is depressed the carriage will be moved forwardly on the tracks 9 and 10.

Extending upwardly through the rear end of the carriage 30 is a U-bolt 34 equipped with a wing nut 35 and adapted to engage a handle 34a of the saw which is clearly shown in Fig. 5. Hook-shaped bolts 36 extend through brackets 37 fixed to the front end of the carriage, said bolts extending longitudinally of the carriage and being designed to engage one of the saw handles 36a which handle rests on the carriage when the saw is inverted and placed in operative position with the blade 41 extending through the slot 43 of the table 42. These bolts 36, in connection with the bolt 34 operate to secure to the carriage the portable power saw which is indicated at 40 and which may be of any suitable or desired construction. The hook-shaped bolts 36 are also provided with wing nuts 38 to facilitate the attachment and removal of the power saw. The table top 42 includes an angle iron frame composed of end and side bars 44 and 45 to which the top proper 42 is attached. This top 42 is hingedly connected at the rear end as shown at 46 in Fig. 3 to the rear end of the table frame so that it may be swung upwardly out of the way when desired. A suitable catch indicated at 47 is carried by the table top and designed to be engaged with a stud 48 on the frame securely locking the top in lowered position when the saw is in operation.

Coil springs 39, one of which is shown in Fig. 3, are disposed in the tubular track members 9 and 10 at the rear portion thereof between the rollers of the rear standards 31 and the ends of the track to form cushioning means for the carriage when it reaches its extreme rearward movement and similar springs are located at the front thereof.

The top 42 may be held in upright position by any suitable means, a folding brace 49 being preferably used for the purpose.

A coiled spring 25a is connected at one end to the cross bar 7 at the rear of the table frame by a suitable link 25 having a hook 26 and at its front end is connected with the lever 21 at a point intermediate its ends and this spring is designed to exert its tension for returning the saw carriage 30 to normal position after it has been moved forward by depression of the pedal 20. A tubular sleeve 27 preferably encircles the coiled spring 25 and forms a protection therefor as well as a guide.

In the use of this table a power operated saw indicated at 40 preferably of the portable type is mounted on the carriage 30 in any suitable manner being here shown secured thereto by the bolts 34 and 36 as above described and after having been so positioned the tracks 9 and 10 having been adjusted to suit the size of the saw, the table top 42 which has been raised to permit the mounting of the saw on the carriage is lowered into operative position and secured by the catch 47. When in this position the cutting blade 41 of the saw will project through the slot 43 of the table, said slot being of a sufficient width to permit the saw blade to move freely back and forth therein without contact. The operator then places the wood to be cut on the table top in front of the saw and by depressing the pedal 20 causes the carriage 30 to move forward carrying with it the saw the operating mechanism of which is preferably electrically controlled and causes the rotating blade 41 to approach the work and move forward performing the desired sawing operation. It will be understood that by using the pedal in the manner above set forth both hands of the operator will be free for manipulating the work, which is especially desirable when pattern work is to be sawed.

It will also be obvious that the saw mounted on the carriage 30 may be used as a stationary saw by allowing it to remain in the position shown without manipulating the carriage through the pedal 20. When the saw is desired for hand use or other use it may be readily detached from the carriage and taken away by lifting the table top and reversing the operation above described.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

What we claim is:

In a saw table, a supporting structure having a top with a slot therein, laterally spaced longitudinally extending tubular tracks mounted on said structure below said top, said tracks being slotted longitudinally on their lower faces, a saw carriage having upstanding roller carried hangers mounted in said tracks with the shanks of the hangers operating in said slots, a lever and link mechanism directly connected with said carriage, a foot pedal connected to actuate said mechanism to move the carriage in one direction, and a coiled spring connected with said mechanism and with the structure to move the carriage in the opposite direction when the pedal is released.

WILLIAM A. TOMLINSON.
HOWELL B. BEARDEN.